US011370347B2

(12) United States Patent
Nishikawa et al.

(10) Patent No.: US 11,370,347 B2
(45) Date of Patent: Jun. 28, 2022

(54) MOBILE CABIN SET, MOBILE CABIN, AND ATTACHMENT FOR CABIN

(71) Applicant: TOYOTA BOSHOKU KABUSHIKI KAISHA, Aichi (JP)

(72) Inventors: Tokuyuki Nishikawa, Aichi (JP); Katsuhito Yamauchi, Aichi (JP); Takeshi Yamada, Aichi (JP); Hiroaki Namba, Aichi (JP); Masahiro Tatenami, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 138 days.

(21) Appl. No.: 16/869,976

(22) Filed: May 8, 2020

(65) Prior Publication Data
US 2020/0369195 A1  Nov. 26, 2020

(30) Foreign Application Priority Data
May 24, 2019  (JP) .............................. JP2019-097800

(51) Int. Cl.
| | |
|---|---|
| *B60P 3/42* | (2006.01) |
| *B60N 2/01* | (2006.01) |
| *B60R 11/02* | (2006.01) |
| *B60N 3/00* | (2006.01) |
| *B60N 2/02* | (2006.01) |

(52) U.S. Cl.
CPC .................. *B60P 3/42* (2013.01); *B60N 2/01* (2013.01); *B60N 2/0292* (2013.01); *B60N 3/001* (2013.01); *B60R 11/02* (2013.01)

(58) Field of Classification Search
CPC .. B60P 3/42; B60N 2/01; B60N 3/001; B60N 2/0292; B60R 11/02
See application file for complete search history.

(56) References Cited

U.S. PATENT DOCUMENTS

2006/0220417 A1* 10/2006 Rasmussen ............... B60P 3/08
296/156

FOREIGN PATENT DOCUMENTS

| DE | 4332557 | 3/1995 |
|---|---|---|
| JP | 2012-006501 | 1/2012 |

OTHER PUBLICATIONS

Office Action issued in the corresponding Chinese patent application No. 202010440092.0 dated Mar. 2, 2022, along with English-language translation thereof.

\* cited by examiner

*Primary Examiner* — D Glenn Dayoan
*Assistant Examiner* — Melissa Ann Bonifazi
(74) *Attorney, Agent, or Firm* — Greenblum & Bernstein, P.L.C.

(57) ABSTRACT

Provided is a mobile cabin set that allows flexible arrangement of layout in a cabin. One aspect of the present disclosure provides a mobile cabin set that includes a cabin body configuring a part of a moving body and including a ceiling surface, a floor surface, and two or more side surfaces that define an interior space; at least one rail arranged on at least one surface of the ceiling surface, or the two or more side surfaces of the cabin body, the at least one rail extending in a direction that intersects a vertical direction; and at least one attachment arranged in the interior space. The at least one rail includes an attachment/detachment mechanism to allow attachment/detachment of the at least one attachment at a given position of the at least one rail.

7 Claims, 17 Drawing Sheets

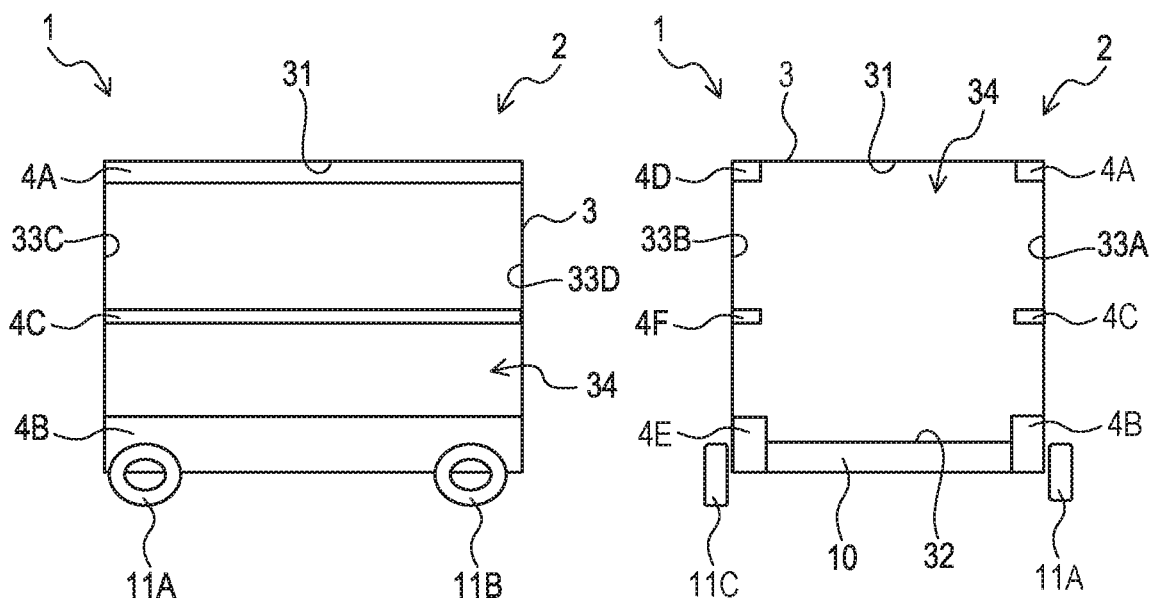
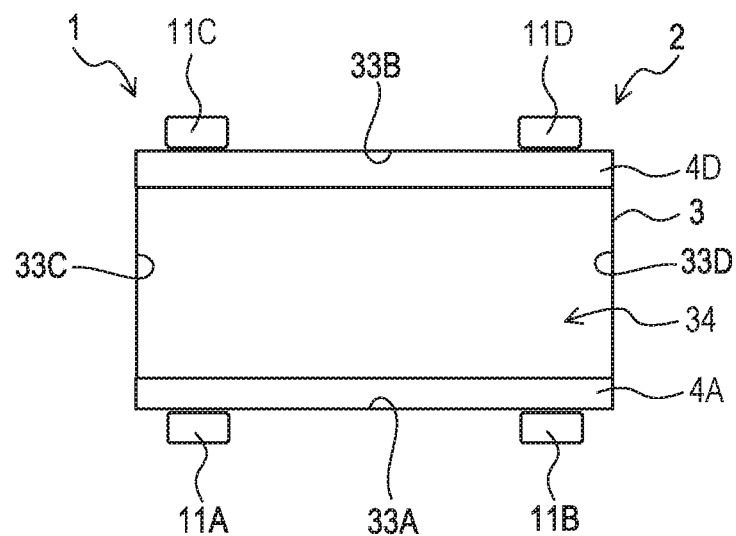

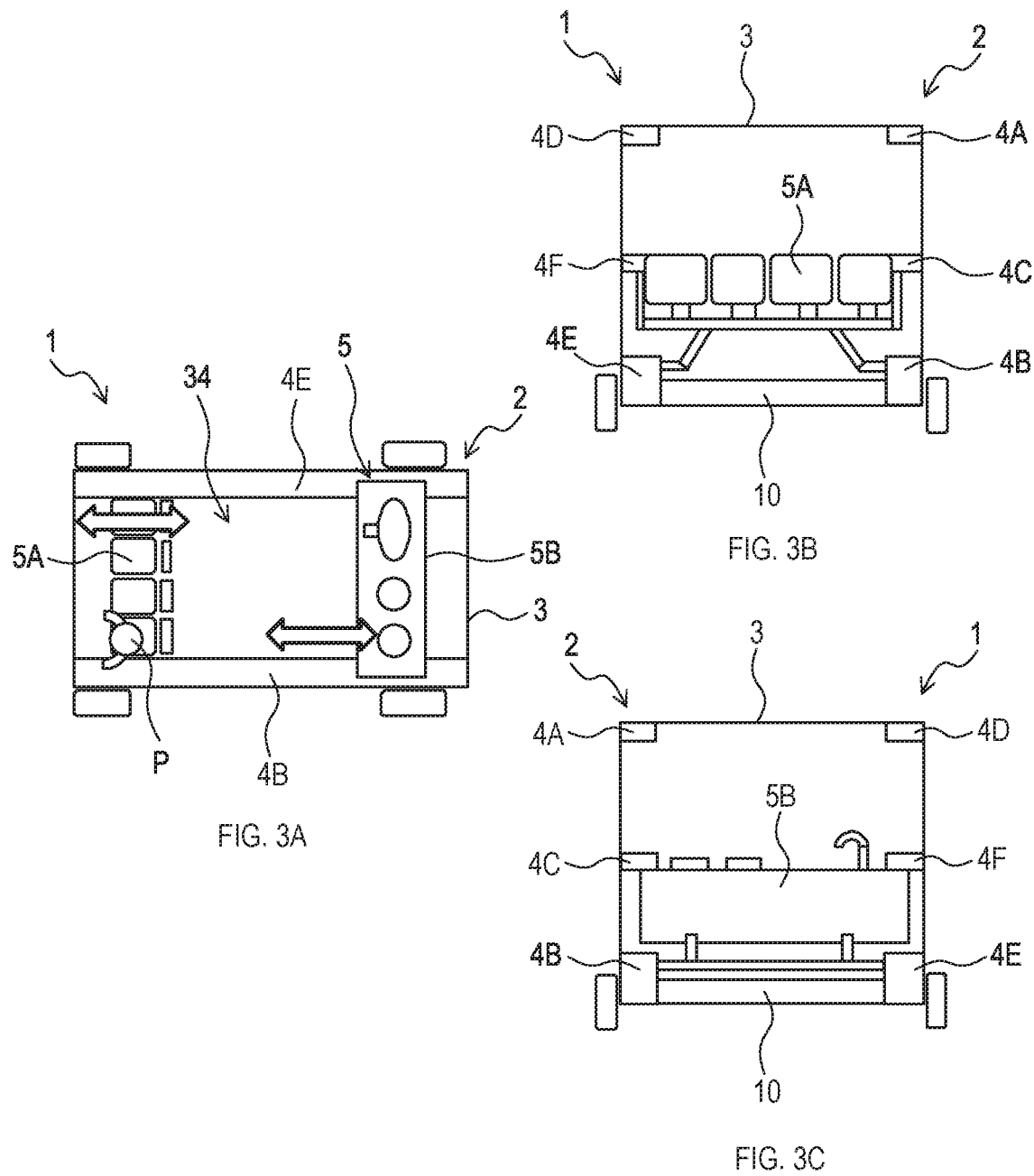

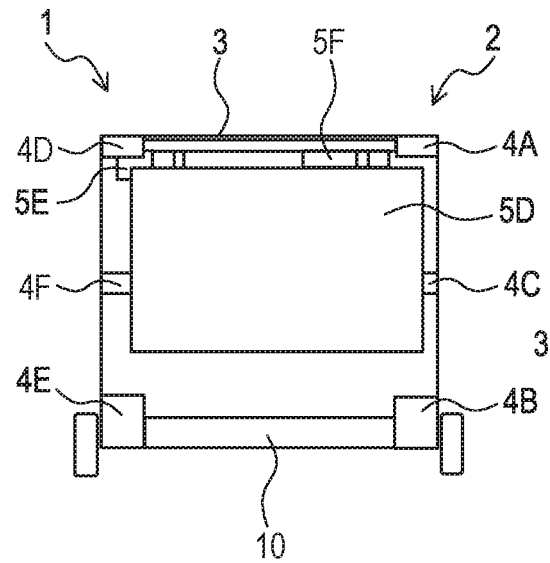
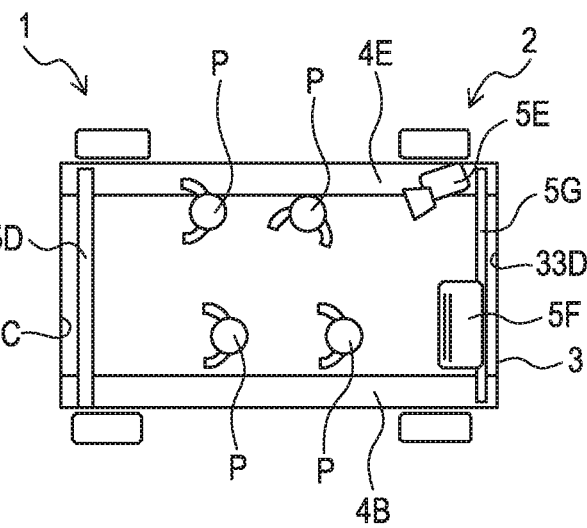
FIG. 5A
FIG. 5B
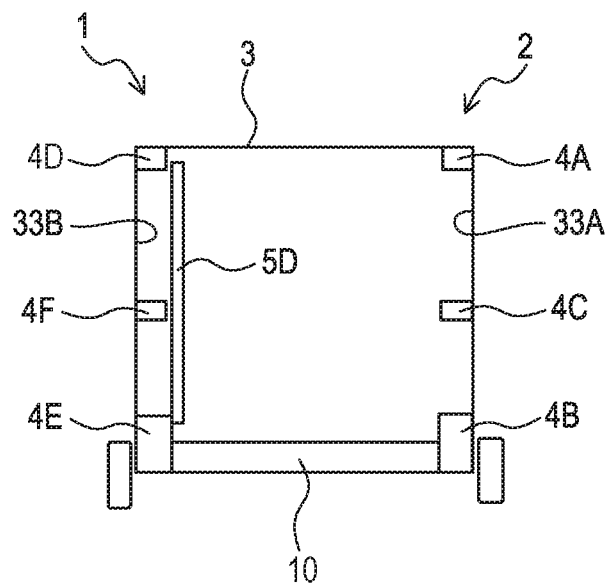
FIG. 5C

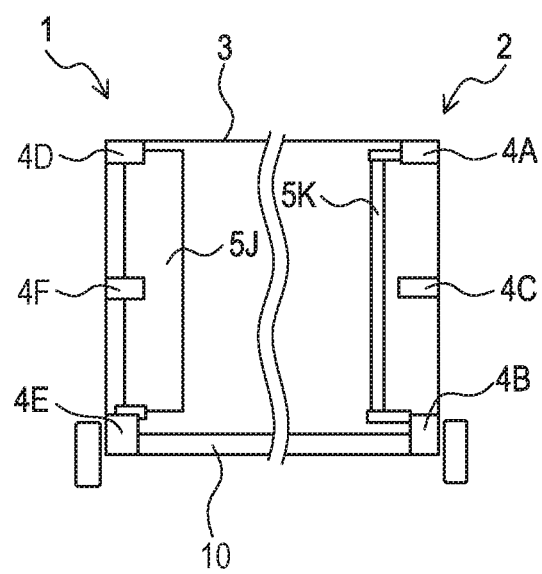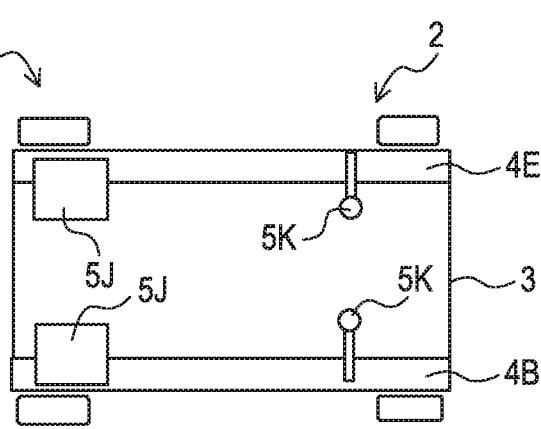
FIG. 7A
FIG. 7B

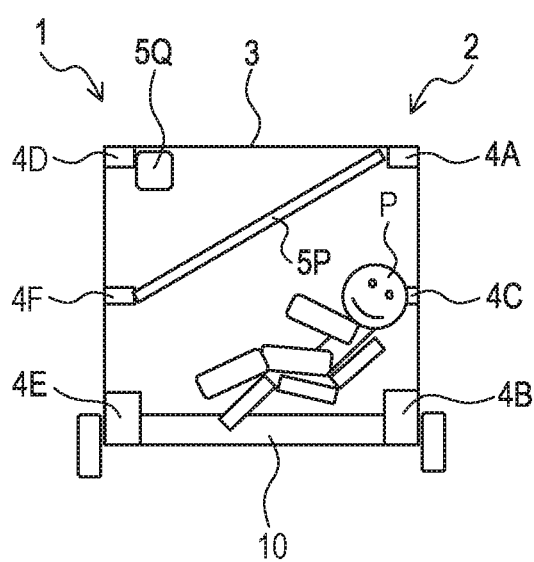
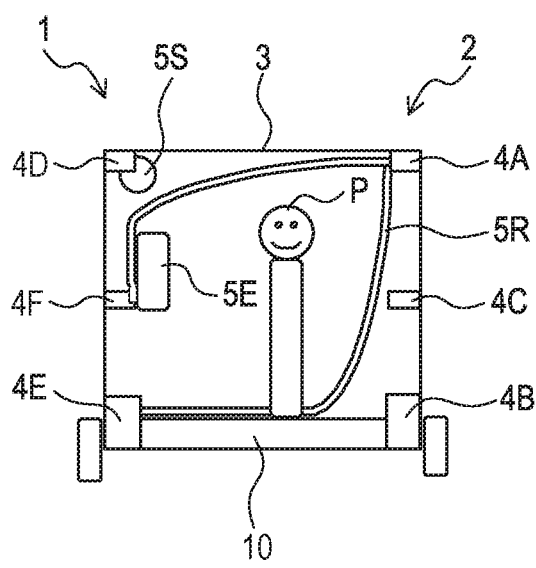
FIG. 10A
FIG. 10B

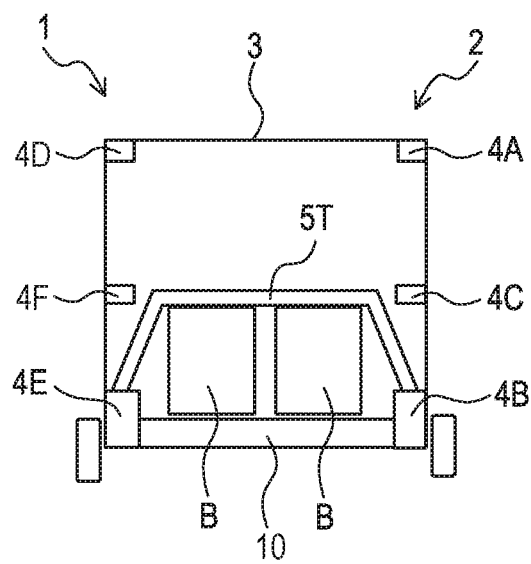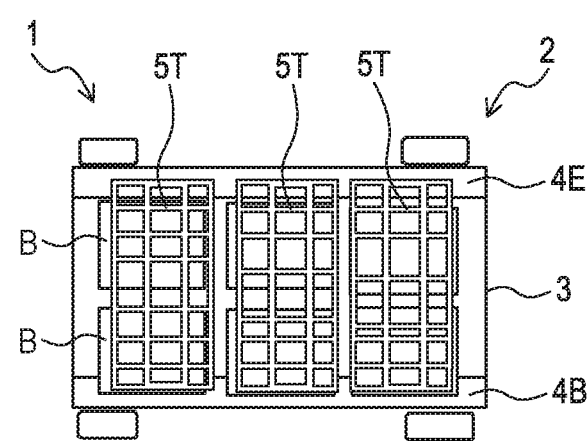
FIG. 11A
FIG. 11B

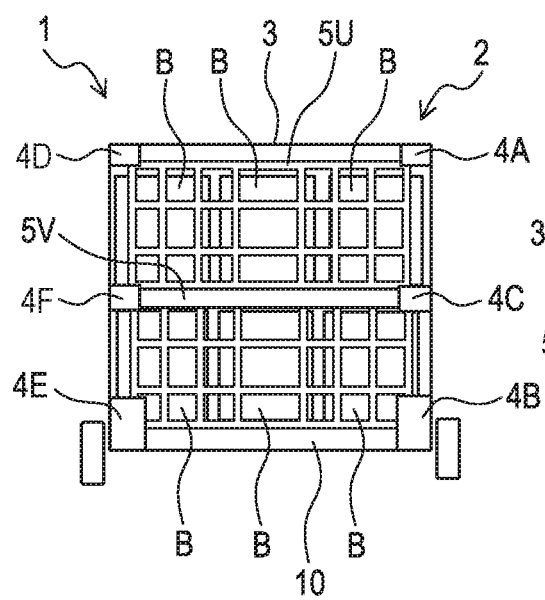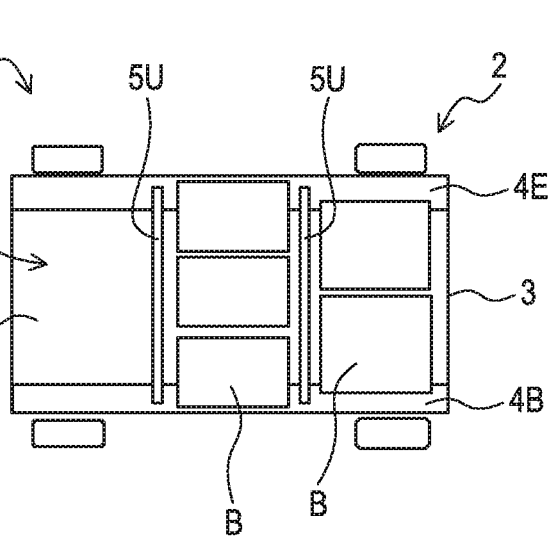
FIG. 13A
FIG. 13B

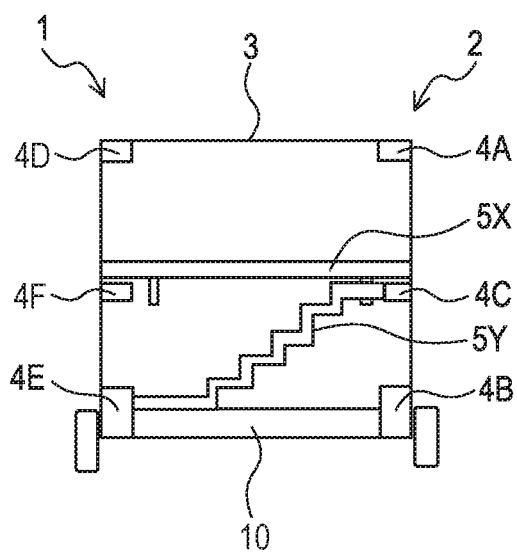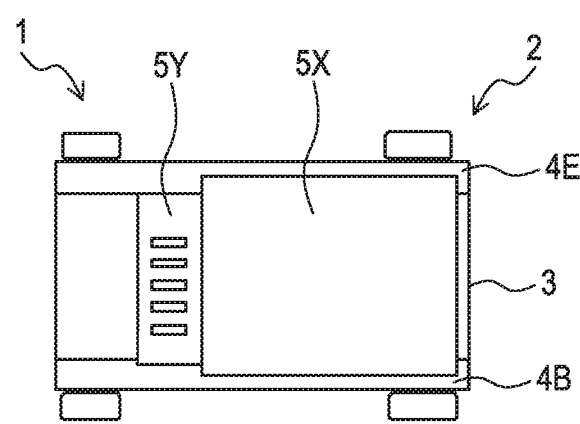
FIG. 15A
FIG. 15B

MOBILE CABIN SET, MOBILE CABIN, AND ATTACHMENT FOR CABIN

CROSS-REFERENCE TO RELATED APPLICATIONS

The present application claims the benefit of Japanese Patent Application No. 2019-97800 filed on May 24, 2019 with the Japan Patent Office, the entire disclosure of which is incorporated herein by reference.

BACKGROUND

The present disclosure relates to a mobile cabin set, a mobile cabin, and an attachment for cabin.

A known seat is arranged in a moving body, such as a vehicle, and is slidable in the moving body (see Japanese Unexamined Patent Application Publication. No. 2012-6501). By sliding the seat in the moving body, an improved degree of freedom in a passenger's seating position can be achieved.

SUMMARY

In such a conventional moving body, the seat may be movable as described above, but other interior components are fixed to a main body (i.e., a cabin) of the moving body. Thus, it is difficult to change layout in the cabin.

In one aspect of the present disclosure, it is preferable to provide a mobile cabin set that allows flexible arrangement of layout in a cabin.

One aspect of the present disclosure provides a mobile cabin set that comprises: a cabin body configuring a part of a moving body and comprising a ceiling surface, a floor surface, and two or more side surfaces that define an interior space; at least one rail arranged on at least one surface of the ceiling surface, or the two or more side surfaces of the cabin body, the at least one rail extending in a direction that intersects a vertical direction; and at least one attachment arranged in the interior space. The at least one rail comprises an attachment/detachment mechanism to allow attachment/detachment of the at least one attachment at a given position of the at least one rail.

This configuration enables a given attachment configuring an interior component to be attached to and detached from the rail, and also enables the attachment to be moved along the rail. Thus, layout in the cabin body can be flexibly arranged depending on an intended use of the cabin body, services to be provided in the cabin body, and so on.

In one aspect of the present disclosure, the at least one rail may comprise two or more rails arranged apart from one another along the vertical direction on a first side surface of the two or more side surfaces. This configuration enables arrangement of a wide variety of attachments along the first side surface of the cabin body. Thus, a more flexible layout in the cabin body can be achieved.

In one aspect of the present disclosure, the two or more rails may comprise a first rail arranged at a connecting portion of the first side surface with the ceiling surface, a second rail arranged at a connecting portion of the first side surface with the floor surface, and a third rail arranged in a region of the first side surface between the first rail and the second rail. This configuration enables arrangement of an attachment, such as a piece of furniture and an electronic device, at an appropriate height and in an appropriate attitude by selecting given one or more of the first rail, the second rail, and the third rail.

In one aspect of the present disclosure, the at least one attachment may comprise at least one piece of equipment for passenger space. This configuration enables the cabin body to be provided as a mobile passenger space.

In one aspect of the present disclosure, the at least one attachment may comprise at least one partition to divide the interior space into two or more spaces. This configuration enables an inside of the cabin body to be divided into two or more sections having respective given sizes depending on an intended use.

Another aspect of the present disclosure provides a mobile cabin that comprises: a cabin body configuring a part of a moving body and comprising a ceiling surface, a floor surface, and two or more side surfaces that define an interior space; and at least one rail arranged on at least one surface of the ceiling surface, or the two or more side surfaces of the cabin body, the at least one rail extending in a direction that intersects a vertical direction. The at least one rail comprises an attachment/detachment mechanism to allow attachment/detachment of at least one attachment arranged in the interior space at a given position of the at least one rail.

A further aspect of the present disclosure provides an attachment for cabin arranged in an interior space of a cabin body configuring a part of a moving body. The attachment for cabin is allowed to be attached/detached at a given position of at least one rail arranged on at least one surface of a ceiling surface, or two or more side surfaces that define the interior space of the cabin body, the at least one rail extending in a direction that intersects a vertical direction.

Such configurations allow an improved flexibility of layout in the cabin body by attaching to or detaching from the rail of a given attachment or by changing a position of a given attachment along the rail.

BRIEF DESCRIPTION OF THE DRAWINGS

Some embodiments of the present disclosure will be described hereinafter by way of example with reference to the accompanying drawings, in which:

FIG. 1A is a schematic side view of a mobile cabin of an embodiment;

FIG. 1B is a schematic front view of the mobile cabin of FIG. 1A;

FIG. 1C is a schematic plan view of the mobile cabin of FIG. 1A;

FIG. 3A is a schematic plan view of a mobile cabin set of an embodiment;

FIG. 3B is a schematic front view of the mobile cabin set of FIG. 3A;

FIG. 3C is a schematic rear view of the mobile cabin set of FIG. 3A;

FIG. 5A is a schematic front view of a mobile cabin set of an embodiment;

FIG. 5B is a schematic plan view of the mobile cabin set of FIG. 5A;

FIG. 5C is a schematic front view of a mobile cabin set of an embodiment different from FIG. 5A;

FIG. 7A is a schematic front view of a mobile cabin set of an embodiment;

FIG. 7B a schematic plan view of the mobile cabin set of FIG. 7A;

FIG. 10A is a schematic front view of a mobile cabin set of an embodiment;

FIG. 10B is a schematic front view of a mobile cabin set of an embodiment;

FIG. 11A is a schematic front view of a mobile cabin set of an embodiment;

FIG. 11B is a schematic plan view of the mobile cabin set of FIG. 11A;

FIG. 13A is a schematic front view of a mobile cabin set of an embodiment;

FIG. 13B is a schematic plan view of the mobile cabin set of FIG. 13A;

FIG. 15A is a schematic front view of a mobile cabin set of an embodiment;

FIG. 15B is a schematic plan view of the mobile cabin set of FIG. 15A;

DETAILED DESCRIPTION OF EXEMPLARY EMBODIMENTS

1. First Embodiment 1-1. [Mobile Cabin]

Figure 2A:
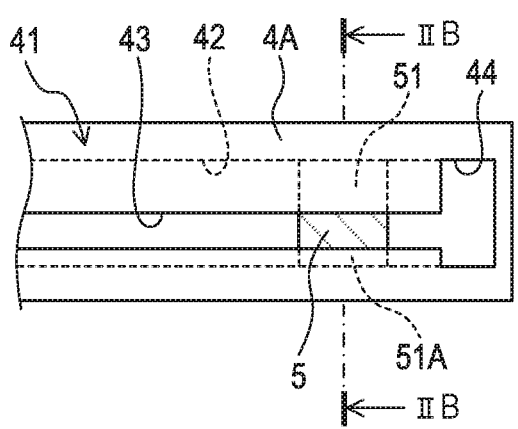
FIG. 2A is a schematic side view of a rail in the mobile cabin of FIG. 1A.

A mobile cabin 2 shown in FIGS. 1A, 1B, and 1C comprises a cabin body 3 and two or more rails (specifically, a first rail 4A, a second rail 4B, a third rail 4C, a fourth rail 4D, a fifth rail 4E, and a sixth rail 4F).

<Cabin Body>

The cabin body 3 comprises a cuboid box body that configures a part of a moving body. Specifically, the cabin body 3 defines a passenger space or a luggage space of a moving body (such as an automobile) that travels by itself on the ground.

The cabin body 3 is coupled to a platform 10 of the moving body. The platform 10 comprises tires 11A, 11B, 11C, and 11D, and a power source (not shown) to drive the tires.

For example, a motor, an engine, or the like is used for the power source of the platform 10. The cabin body 3 is placed on the platform 10 and moves together with the platform 10. A coupling manner between the platform 10 and the cabin body 3 is not limited to that in the present embodiment. For example, the platform 10 may be coupled to a forward or rearward portion of the cabin body 3 along a traveling direction (a longitudinal direction, or forward and rearward).

The cabin body 3 comprises a ceiling surface 31, a floor surface 32, a first side surface 33A, a second side surface 33B, a third side surface 33C, and a fourth side surface 33D that define an interior space 34. The ceiling surface 31 and the floor surface 32 are arranged to face each other. Each of the first to fourth side surfaces 33A, 33B, 33C, and 33D couples the ceiling surface 31 to the floor surface 32 along a vertical direction (up and down). The interior space 34 of the cabin body 3 is a movable space (that is, a space of mobility) that is not fixed to one point.

The first side surface 33A and the second side surface 33B are each parallel to a moving direction of the moving body, and face each other. The third side surface 33C and the fourth side surface 33D each couple the first side surface 33A and the second side surface 33B, and face each other.

In the cabin body 3, walls forming the ceiling surface 31, the floor surface 32, and the side surfaces 33A, 33B, 33C, and 33D may at least partially comprise a transparent member, such as glass, (that is, a window). Also, the ceiling surface 31, the floor surface 32, and the side surfaces 33A, 33B, 33C, and 33D at least partially comprises an openable/closable portion forming an entrance (that is, a door) of the cabin body 3.

<Rail>

Two or more rails 4A, 4B, 4C, 4D, 4E, and 4F extend along a direction that intersects the vertical direction, and specifically along a horizontal direction. That is, the rails 4A, 4B, 4C, 4D, 4E, and 4F each have a longitudinal direction parallel to the horizontal direction.

The first rail 4A (top rail, left side) is arranged at a connecting portion (that is, an upper end) of the first side surface 33A with the ceiling surface 31. The first rail 4A is fixed at least to the first side surface 33A. The first rail 4A may be fixed to both of the first side surface 33A and the ceiling surface 31. The first rail 4A is arranged to extend from one end to the other end of the first side surface 33A along the horizontal direction.

The second rail 4B (center rail, left side) is arranged at a connecting portion (that is, a lower end) of the first side surface 33A with the floor surface 32. The second rail 4B is fixed at least to the first side surface 33A. The second rail 4B may be fixed to both of the first side surface 33A and the floor surface 32. The second rail 4B is arranged parallel to the first rail 4A and extending from one end to the other end of the first side surface 33A along the horizontal direction.

The third rail 4C (bottom rail, left side) is arranged in a region of the first side surface 33A between the first rail 4A and the second rail 4B. The third rail 4C is fixed to the first side surface 33A. The third rail 4C is arranged parallel to the first rail 4A and the second rail 4B, and extending from one end to the other end of the first side surface 33A along the horizontal direction.

The first rail 4A, the second rail 4B, and the third rail 4C are arranged on the first side surface 33A to be spaced apart from one another along the vertical direction (located at different heights).

The fourth rail 4I) is arranged at a connecting portion of the second side surface 33B with the ceiling surface 31. The fourth rail 4D has a horizontally reversed shape of the first rail 4A, and faces the first rail 4A.

The fifth rail 4E is arranged at a connecting portion of the second side surface 33B with the floor surface 32. The fifth rail 4E has a horizontally reversed shape of the second rail 4B, and faces the second rail 4B.

The sixth rail 4F is arranged in a region of the second side surface 33B between the fourth rail 4D and the fifth rail 4E. The sixth rail 4F has a horizontally reversed shape of the third rail 4C, and faces the third rail 4C.

Figure 2B:
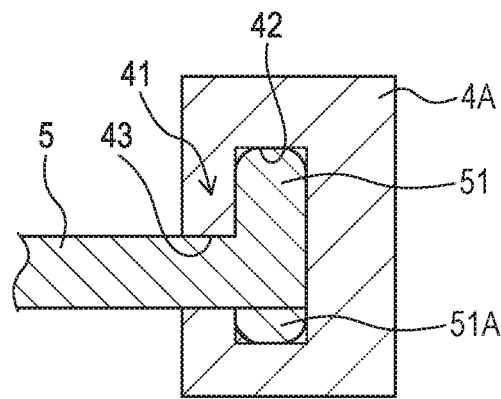
FIG. 2B is a schematic sectional view taken along a line IIB-IIB in FIG. 2A.

As shown in FIGS. 2A and 2B, the first rail 4A comprises an attachment/detachment mechanism 41 to allow attachment/detachment of a below-described attachment 5 at a given position. The attachment/detachment mechanism 41 of the present embodiment comprises a hollow space 42 extending along a longitudinal direction of the first rail 4A, a channel 43 communicating the hollow space 42 with an exterior of the first rail 4A, and an insertion opening 44 provided continuously with the channel 43.

The channel 43 has a height (vertical width) smaller than a height (vertical width) of the hollow space 42. The hollow space 42 has an upper end positioned higher than the channel 43 and a lower end positioned lower than the channel 43. The insertion opening 44 is configured such that the height of the channel 43 is equal to or greater than the height of the hollow space 42.

A attachment portion 51 of the attachment 5 is contained in the hollow space 42. The attachment portion 51 has a vertical width greater than the vertical width of the channel 43. Thus, the attachment portion 51 arranged in the hollow space 42 cannot be pulled out from the channel 43.

The attachment portion 51 arranged in the hollow space 42 abuts an inner wall of the hollow space 42, thereby inhibiting rotation of the attachment portion 51 about its axis parallel to the longitudinal direction of the first rail 4A. As a result, the attachment portion 51 is held by the first rail 4A.

Also, the attachment portion 51 is slidable along the channel 43 and along the longitudinal direction of the first rail 4A. Such sliding movement of the attachment portion 51 enables movement of the attachment 5 to a given position, while holding the attachment 5 by the first rail 4A.

The attachment portion 51 of the attachment 5 is inserted through the insertion opening 44 into the hollow space 42, and is slid along the longitudinal direction of the first rail 4A to a position overlapping the channel 43, and thereby the attachment portion 51 is held by the first rail 4A. The insertion opening 44 need not necessarily be provided at an end of the channel 43 along the longitudinal direction of the first rail 4A, but may be provided at an optional position. Multiple insertion points may exist. Also, the attachment/detachment mechanism 41 need not necessarily include the insertion opening 44.

For example, the attachment portion 51 may comprise a deformation mechanism in which a lower part 51A of the attachment portion 51 moves upward by an operation of a lever provided to the attachment 5. The deformation mechanism allows insertion of the attachment portion 51 from the channel 43 into the hollow space 42, in a state where the lower part 51A is moved upward than the lower end of the channel 43. After the insertion into the hollow space 42, the lower part 51A is brought to project from the lower end of the channel 43, and thereby the attachment portion 51 is held by the first rail 4A. When removing the attachment portion 51 from the first rail 4A, the lower part 51A is moved upward and the attachment portion 51 is rotated in the hollow space 42, and thereby the attachment portion 51 can be pulled out from the hollow space 42.

The second rail 4B, the third rail 4C, the fourth rail 4D, the fifth rail 4E, and the sixth rail 4F each comprise a corresponding attachment/detachment mechanism 41, which is similar to that of the first rail 4A.

Each of the rails formed of, for example, metal has sufficient rigidity to stably hold the attachment 5. This enables reduction in required rigidity of the attachment 5, and thus enables weight reduction and a simplified configuration of the attachment 5.

Each of the rails may comprise wires, for example, to supply power to the attachment 5 and to perform telecommunications with the attachment 5, and electrodes to electrically connect the attachment 5 to the aforementioned wires.

[1-2 Mobile Cabin Set]

A mobile cabin set 1 shown in FIG. 3A comprises the mobile cabin 2, and at least one attachment 5.

<Attachment>

The attachment 5 is an attachment for cabin to be arranged in the interior space 34 of the cabin body 3.

The attachment 5 is placed in the interior space 34 by being attached to one of the rails 4A, 4B, 4C, 4D, 4E, and 4F. The attachment 5 comprises at least one attachment portion 51 (see FIGS. 2A and 2B).

In an example of FIG. 3A, the mobile cabin set 1 comprises, as the attachments 5, a chair unit 5A and a kitchen unit 5B. As shown in FIGS. 3B and 3C, the chair unit 5A and the kitchen unit 5B are each attached to the second rail 4B, the third rail 4C, the fifth rail 4E, and the sixth rail 4F.

As shown in FIG. 3A, the chair unit 5A and the kitchen unit 5B are each movable along the longitudinal directions of the rails. The chair unit 5A and the kitchen unit 5B are pieces of equipment for passenger space to make the cabin body 3 a mobile passenger space. A passenger P stays in the passenger space during moving or stopping of the moving body.

Other examples of the attachment 5 are described below.

Figure 4A:
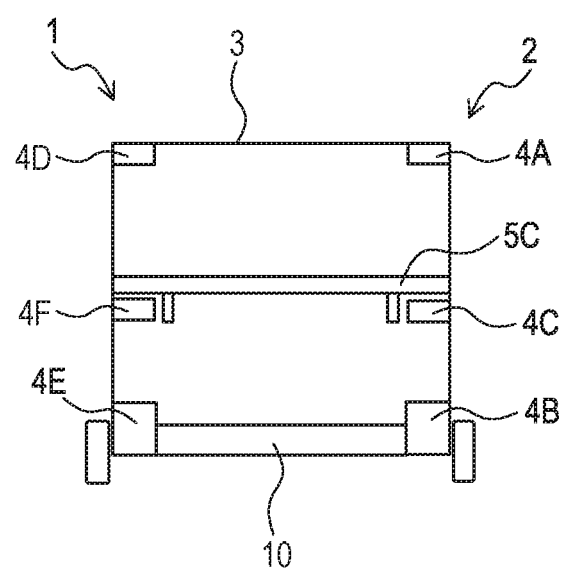
FIG. 4A is a schematic front view of an mobile cabin set of an embodiment.
Figure 4B:
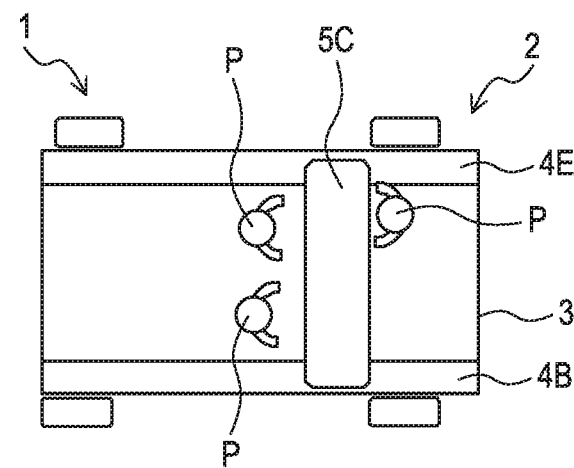
FIG. 4B is a schematic plan view of the mobile cabin set of FIG. 4A.

FIGS. 4A and 4B show a table 5C, which is also one example of the equipment for passenger space. The table 5C is attached to the third rail 4C and the sixth rail 4F.

FIGS. 5A and 5B show a monitor 5D, a camera 5E, and an air conditioner 5F, which are also examples of the equipment for passenger space. The monitor 5D is attached to the first rail 4A, the third rail 4C, the fourth rail 4D, and the sixth rail 4F. The camera 5E is attached to the fourth rail 4D. The air conditioner 5F is attached to the first rail 4A and the fourth rail 4D through a support beam 5G.

As shown in FIG. 5C, the monitor 5D may be attached to the fourth rail 4D, the fifth rail 4E, and the sixth rail 4F. Specifically, the monitor 5D may be arranged along the first side surface 33A or the second side surface 33B to which the rail is provided, or may be arranged along the third side surface 33C or the fourth side surface 33D to which no rail is provided.

Figure 6A:
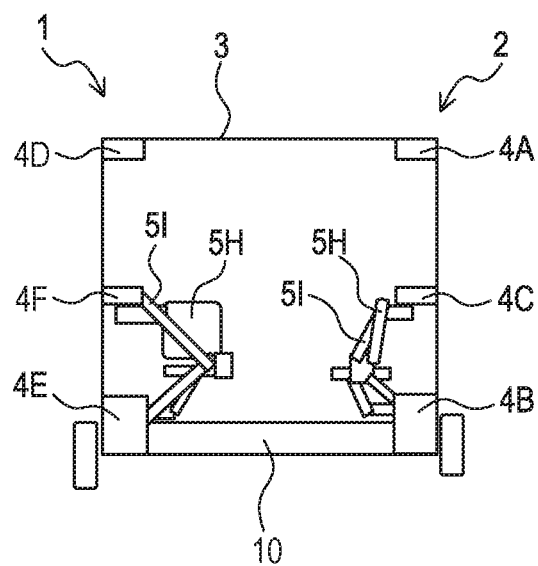
FIG. 6A is a schematic front view of a mobile cabin set of an embodiment.
Figure 6B:
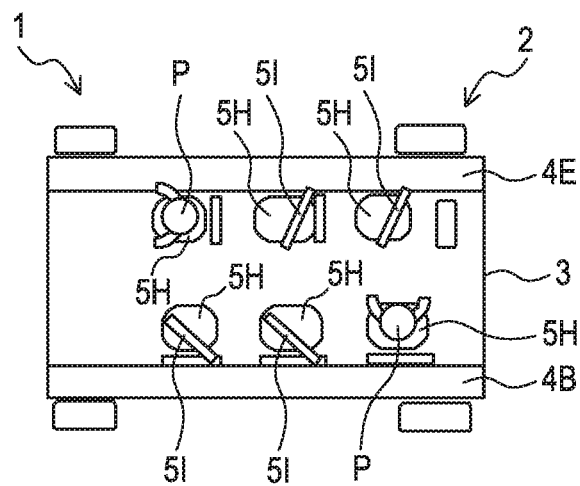
FIG. 6B a schematic plan view of the mobile cabin set of FIG. 6A.

FIGS. 6A and 6B show multiple seats 5H and multiple seat belts 5I, which are examples of the equipment for passenger space. The seats 5H and the seat belts 5I are each attached to the second rail 4B and the third rail 4C, or attached to the fifth rail 4E and the sixth rail 4F, and arranged to be parallel to the longitudinal direction of the rails. The seats 5H may be arranged such that each seat front side faces forward in the traveling direction of the moving body, or may be arranged such that each seat front side faces inward of the cabin body 3.

FIGS. 7A and 7B show cabinets 5J and poles 5K, which are also examples of the equipment for passenger space. The cabinets 5J and the poles 5K are each attached across the first rail 4A, the second rail 4B, and the third rail 4C, or attached across the fourth rail 4D, the fifth rail 4E, and the sixth rail 4F.

Figure 8:
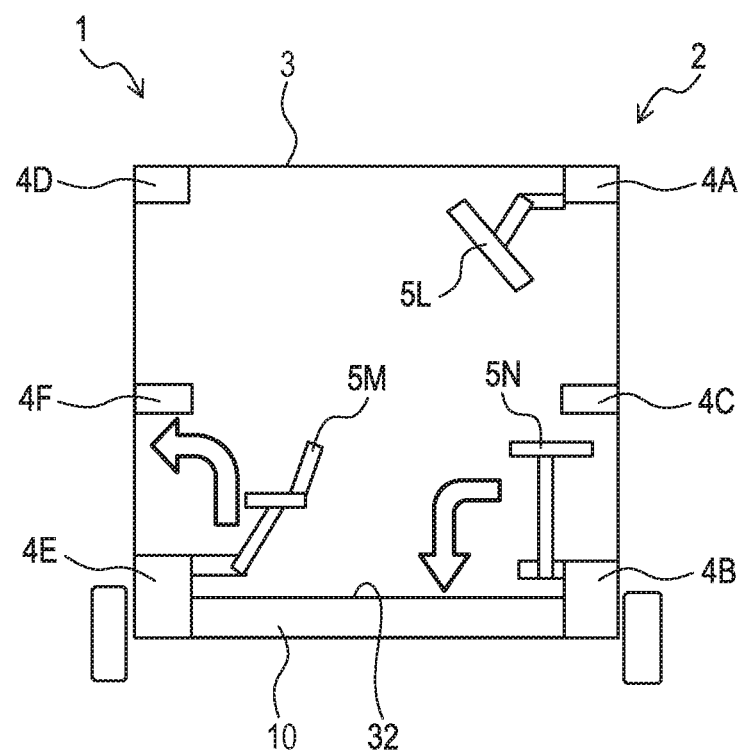
FIG. 8 is a schematic front view of a mobile cabin set of an embodiment.

FIG. 8 shows an electronic device 5L, a seat 5M, and a table 5N shown in are also examples of the equipment for passenger space. The electronic device 5L is attached to the first rail 4A. The electronic device 5L is, for example, a monitor, a sensor, or other device. The seat 5M is attached to the fifth rail 4E. The seat 5M is retractable (or foldable) between the fifth rail 4E and the sixth rail 4F. The table 5N is attached to the second rail 4B. The table 5N is retractable (or foldable) in the vicinity of a floor surface 32.

Figure 9:
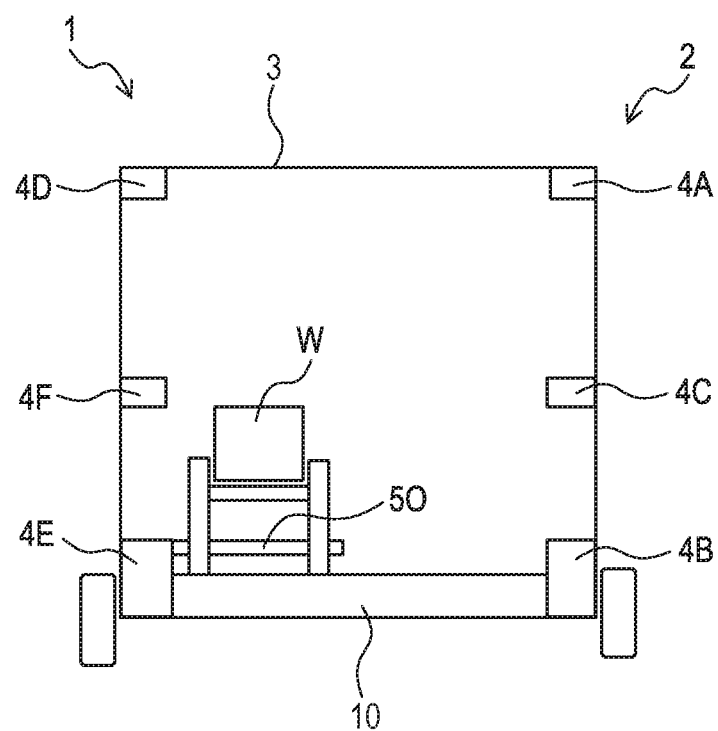
FIG. 9 is a schematic front view of a mobile cabin set of an embodiment.

FIG. 9A shows a wheelchair fixing device 5O, which is also one example of the equipment for passenger space. The wheelchair fixing device 5O is attached to the fifth rail 4E. The wheelchair fixing device 5O is a tool for fixing wheels of a passenger's wheelchair W.

FIG. 10A shows a screen 5P and a projector 5Q, and FIG. 10B shows the camera 5E, a back screen 5R, and a lighting fixture 5S. These are also examples of the equipment for passenger space. The screen 5P in FIG. 10A is attached between and bridging the first rail 4A and the sixth rail 4F. The projector 5Q is attached to the fourth rail 4D to project images on the screen 5P from behind the screen 5P.

The camera 5E in FIG. 10B is attached to the sixth rail 4F together with the back screen 5R. The back screen 5R is disposed between and bridging the first rail 4A and the fifth rail 4E, and is also disposed between and bridging the first rail 4A and the sixth rail 4F. The lighting fixture 5S is attached to the fourth rail 4D.

FIGS. 11A and 11B show a luggage fixing device 5T, which is one example of equipment for luggage space to make the cabin body 3 to be a luggage space for transporting or storing luggage. The luggage fixing device 5T is a lashing belt to cover luggage B to thereby inhibit movement of the luggage B. The luggage fixing device 5T is disposed between and bridging the second rail 4B and the fifth rail 4E.

The mobile cabin set 1 may include, as the attachment 5, a partition to divide the interior space 34 of the cabin body 3 into two or more spaces. The mobile cabin set 1 including the partition as the attachment 5 enables dividing an inside of the cabin body 3 into two or more sections having respective given sizes.

Figure 12A:
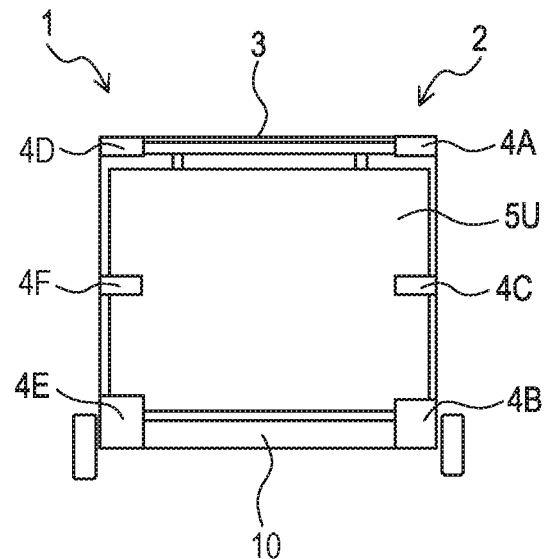
FIG. 12A is a schematic front view of a mobile cabin set of an embodiment.
Figure 12B:
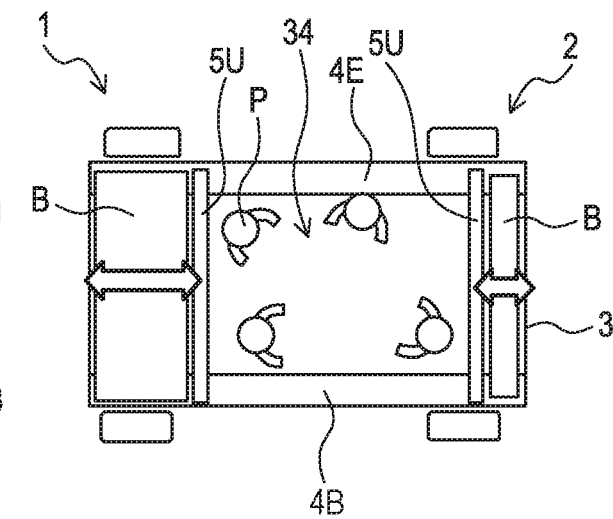
FIG. 12B is a schematic plan view of the mobile cabin set of FIG. 12A.
Figure 12C:
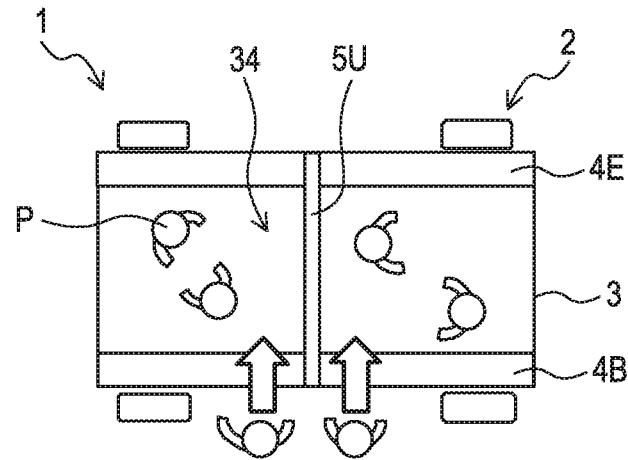
FIG. 12C is a schematic plan view of the mobile cabin set of FIG. 12A.

A partition 5U shown in FIG. 12A is a board attached to all of the rails 4A, 4B, 4C, 4D, 4E, and 4F. The partition 5U includes a wall orthogonal to a longitudinal direction of each rail. As shown in FIG. 12B, the partition 5U may divide the interior space 34 into a passenger space and a luggage space having respective given sizes along the traveling direction of the moving body. Also, as shown in FIG. 12C, two or more passenger spaces may be defined by the partition 5U, and an entrance may be provided for each of the passenger spaces.

As shown in FIGS. 13A and 13B, the partition 5U may be configured with a lashing belt. A luggage shelf 5V shown in FIGS. 13A and 13B is attached between and bridging the third rail 4C and the sixth rail 4F. The luggage shelf 5V also functions as a partition to vertically divide the interior space 34.

Figures 14A, 14B:
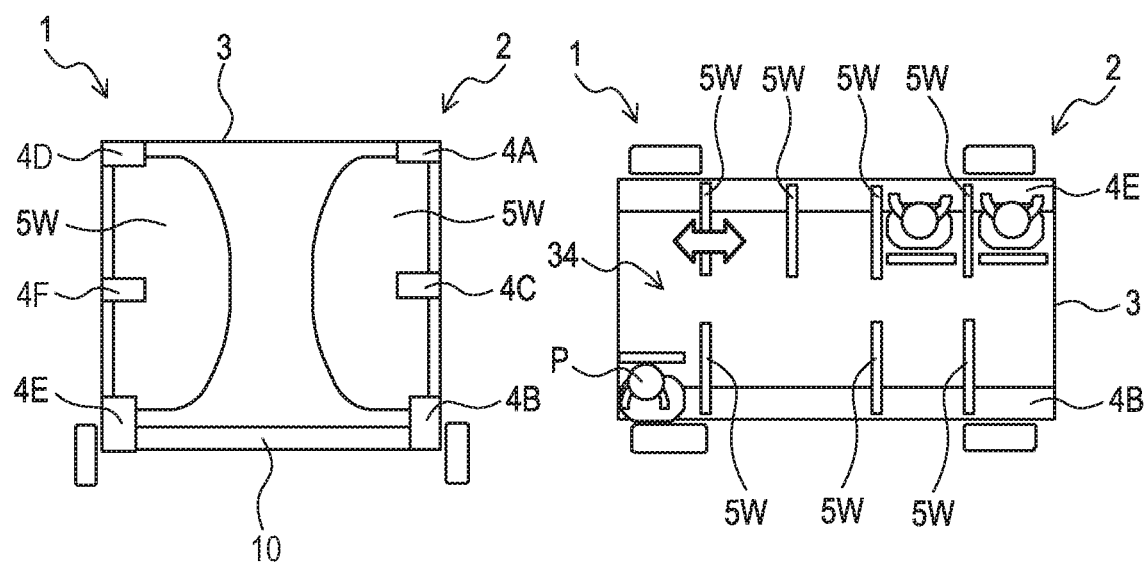
FIG. 14A is a schematic front view of a mobile cabin set of an embodiment.
FIG. 14B is a schematic plan view of the mobile cabin set of FIG. 14A.

Multiple partitions 5W shown in FIGS. 14A and 14B are used as partitions to partially divide the interior space 34 to be used as the passenger space. Each of the partitions 5W is attached across the first rail 4A, the second rail 4B, and the third rail 4C, or attached across the fourth rail 4D, the fifth rail 4E, and the sixth rail 4F. Each of the partitions 5W may be positionally adjusted along the longitudinal directions of the rails to which the partition 5W is attached.

A floorboard 5X shown in FIGS. 15A and 15B is disposed between and bridging the third rail 4C and the sixth rail 4F. The floorboard 5X vertically divides the interior space 34 to thereby form the second floor. A staircase 5Y includes an upper end attached to the third rail 4C and a lower end attached to the fifth rail 4E. The staircase 5Y forms an approach to an upper surface of the floorboard 5X (that is, the second floor). The first floor and the second floor divided by the floorboard 5X are each used as the passenger space or the luggage space.

[1-3. Effects]

The above-detailed embodiments achieve the following effects:

(1a) It is possible to attach and detach the given attachment 5 that configures an interior component to and from the rail 4A, 4B, 4C, 4D, 4E, or 4F, and to move the attachment 5 along the rail 4A, 4B, 4C, 4D, 4E, or 4F. Thus, layout inside the cabin body 3 can be arranged in accordance with, for example, an intended use of the cabin body 3 and services to be provided inside the cabin body 3.

(1b) It is possible to arrange various types of the attachments 5 along the side surface 33A and/or the side surface 33B since the rails 4A, 4B, 4C, 4D, 4E, and 4F are arranged on the side surfaces 33 and 33B of the cabin body 3. Thus, an improved flexibility of the layout inside the cabin body 3 can be achieved.

(1c) It is possible to select one or more of the first rail 4A, the second rail 4B, the third rail 4C, the fourth rail 4D, the fifth rail 4E, and the sixth rail 4F to thereby arrange the attachment 5, such as a piece of furniture and an electronic device, at an appropriate height and in an appropriate attitude.

2. Other Embodiments

Although some embodiments of the present disclosure have been described above, it is to be understood that the present disclosure is not limited to the above-described embodiments, but may be implemented in various forms.

(2a) In the mobile cabin set 1 and the mobile cabin 2 of the above-described embodiments, the first rail 4A, the second rail 4B, and the third rail 4C may be arranged on the third side surface 33C or the fourth side surface 33D. Also, each of the rails may be arranged across two or more side surfaces.

(2b) The mobile cabin set 1 and the mobile cabin 2 of the above-described embodiments may include only some of the first rail 4A, the second rail 4B, the third rail 4C, the fourth rail 4D, the fifth rail 4E, and the sixth rail 4F. Also, the mobile cabin set 1 and the mobile cabin 2 may include any rail other than the first rail 4A, the second rail 4B, the third rail 4C, the fourth rail 4D, the fifth rail 4E, and the sixth rail 4F.

Further, the mobile cabin set 1 and the mobile cabin 2 may include a rail arranged on the ceiling surface 31 of the cabin body 3. Moreover, the mobile cabin set 1 and the mobile cabin 2 may include only a single rail.

Figure 16A:
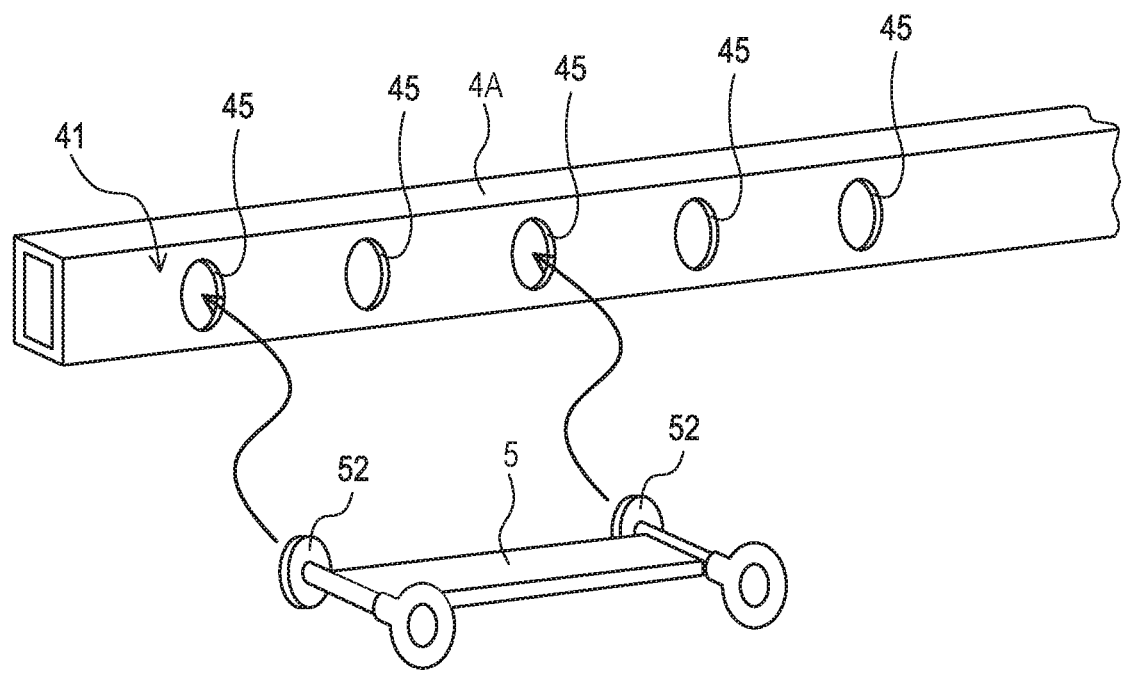
FIG. 16A is a schematic perspective view of an attachment/detachment mechanism of an embodiment different from FIG. 2A.
Figure 16B:
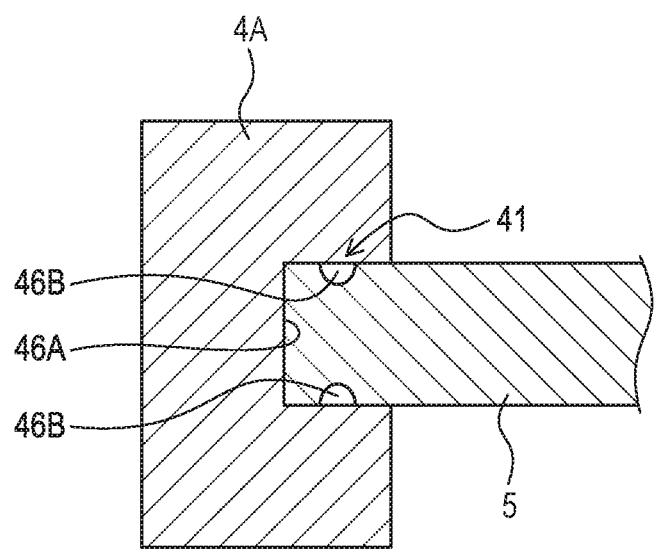
FIG. 16B is a schematic sectional view of an attachment/detachment mechanism of an embodiment different from FIG. 2A and FIG. 16A.

(2c) In the mobile cabin set 1 and the mobile cabin 2 of the above-described embodiments, the attachment/detachment mechanism 41 is not limited to the above-described configuration but may have any configuration that allows attachment/detachment of the attachment 5. For example, the attachment/detachment mechanism 41 shown in FIG. 16A includes two or more oval holes 45. By inserting an oval plate-shaped insertion portion 52 provided to the attachment 5 into a given one of the holes 45 and rotating the insertion portion 52, the attachment 5 is attached to the rail 4A. Also, the attachment/detachment mechanism 41 shown in FIG. 16B includes a channel 46A allowing insertion therein of the attachment 5 and two or more protrusions 46B protruding from side surfaces facing each other (that is, an upper surface and a lower surface) of the channel 46A. The protrusions 46B clamp the attachment 5 in the channel 46A, to thereby lock the attachment 5.

The attachment/detachment mechanism 41 is not limited to a mechanical structure, but may be configured to hold the attachment 5 with magnetic force. For example, the attachment/detachment mechanism 41 may include an electromagnet that attaches/detaches the attachment 5 by turning on/off of current supply.

Figure 17A:
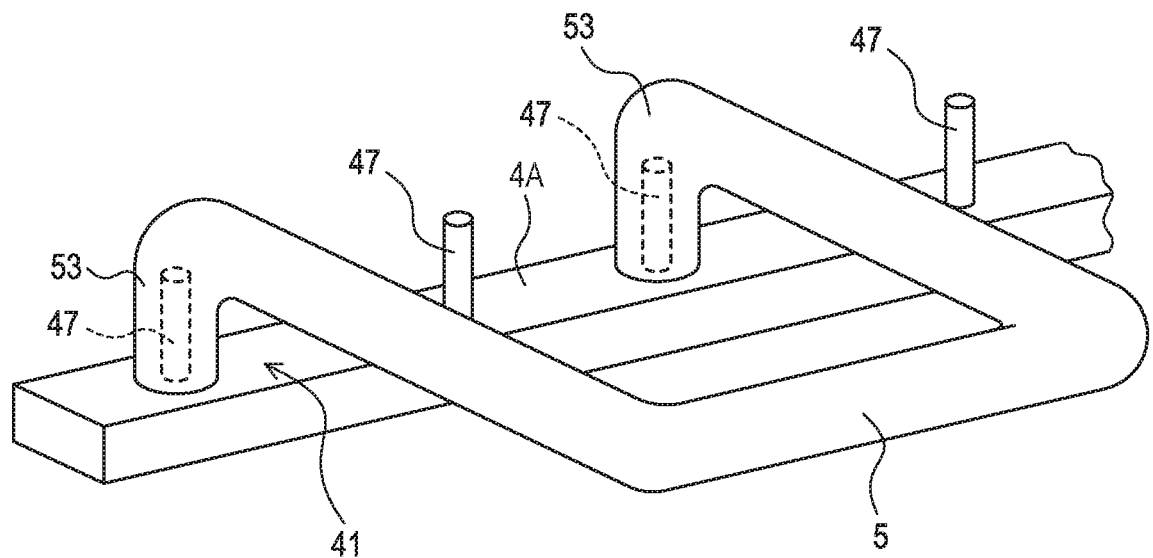
FIG. 17A is a schematic perspective view of an attachment/detachment mechanism of an embodiment different from FIG. 2A, FIG. 16A, and FIG. 16B.
Figure 17B:
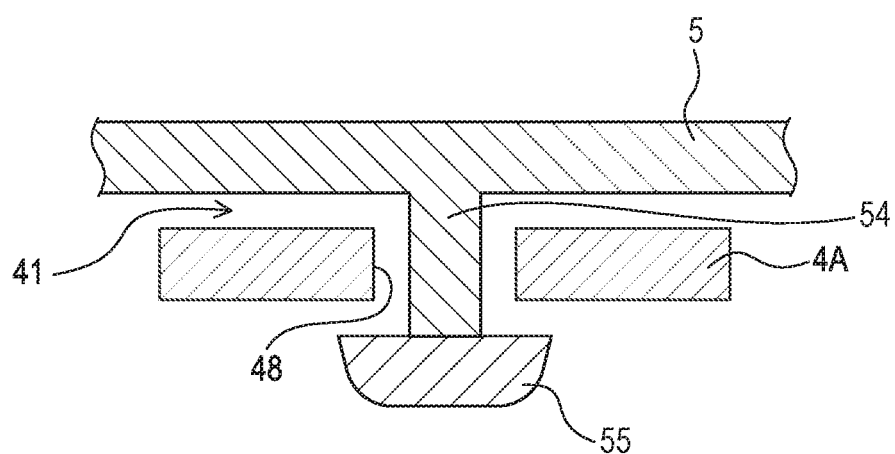
FIG. 17B is a schematic sectional view of an attachment/detachment mechanism of an embodiment different from FIG. 2A, FIG. 16A, FIG. 16B, and FIG. 17A.

Further, a direction of attachment/detachment of the attachment 5 relative to the rail 4A may be vertical. For example, the attachment/detachment mechanism 41 shown in FIG. 17A includes two or more pins 47 projecting upward from a main body of the rail 4A. By inserting tubular portions 53 provided to the attachment 5 around given pins 47, the attachment 5 is attached to the rail 4A. Any holding mechanism as described above (i.e., locking by protrusions, holding by magnetic force, etc.) may be used to fix the tubular portions 53 and the pins 47. Moreover, the attachment/detachment mechanism 41 shown in FIG. 17B includes a hole 48 allowing vertical insertion of a pin. 54 provided to the attachment 5. An elastically deforming portion 55 provided at an end of the pin 54 inhibits the pin 54 from being pulled out of the hole 48.

(2d) The moving body configured with the mobile cabin set 1 and the mobile cabin 2 in the above-described embodiments is not limited to a vehicle that travels on the ground. The moving body may be, for example, a ship or boat, an aircraft, a space ship, and so on.

(2e) A function performed by a single element in the above-described embodiments may be achieved by a plurality of elements, or a function performed by a plurality of elements may be achieved by a single element. Also, a part of a configuration in the above-described embodiments may be omitted. Moreover, at least a part of a configuration in the above-described embodiments may be added to, or may replace, another configuration of the above-described embodiments. Any form included in the technical idea defined in the language of the claims may be an embodiment of the present disclosure.

What is claimed is:

1. A mobile cabin set comprising:
cabin body configuring a part of a moving body and comprising a ceiling surface, a floor surface, and two or more side surfaces that define an interior space;
at least one rail connected to at least one surface of the ceiling surface, or the two or more side surfaces of the cabin body, the at least one rail extending in a direction that intersects a vertical direction; and
at least one attachment arranged in the interior space, the at least one rail comprising an attachment/detachment mechanism to allow attachment/detachment of the at least one attachment at a given position of the at least one rail.

2. The mobile cabin set according to claim 1, wherein the at least one rail comprises two or more rails arranged apart from one another along the vertical direction on a first side surface of the two or more side surfaces.

3. The mobile cabin set according to claim 2, wherein the two or more rails comprise a first rail arranged at a connecting portion of the first side surface with the ceiling surface, a second rail arranged at a connecting portion of the first side surface with the floor surface, and a third rail arranged in a region of the first side surface between the first rail and the second rail.

4. The mobile cabin set according to claim 1, wherein the at least one attachment comprises at least one piece of equipment for passenger space.

5. The mobile cabin set according to claim 1, wherein the at least one attachment comprises at least one partition to divide the interior space into two or more spaces.

6. A mobile cabin comprising:
a cabin body configuring a part of a moving body and comprising a ceiling surface, a floor surface, and two or more side surfaces that define an interior space; and
at least one rail connected to on at least one surface of the ceiling surface, or the two or more side surfaces of the cabin body, the at least one rail extending in a direction that intersects a vertical direction,
the at least one rail comprising an attachment/detachment mechanism to allow attachment/detachment of at least one attachment arranged in the interior space at a given position of the at least one rail.

7. An attachment for cabin to be arranged in an interior space of a cabin body that configures a part of a moving body, the attachment for cabin comprising:
an attachment portion, wherein
the attachment for cabin is detachably attachable at a given position of at least one rail connected to at least one surface of a ceiling surface, or two or more side surfaces that define the interior space of the cabin body, the at least one rail extending in a direction that intersects a vertical direction,
the at least one rail includes a hollow space extending along a longitudinal direction of the at least one rail, and a channel communicating the hollow space with an exterior of the at least one rail, and
the attachment portion is retainable in the hollow space so as to abut an inner wall of the hollow space.

* * * * *